INSTRUMENT COOLING SYSTEM

Filed Jan. 16, 1967

INVENTOR.
JOHN J. J. STAUNTON

BY Bair, Freeman & Molinare

ATTORNEYS

United States Patent Office 3,407,869
Patented Oct. 29, 1968

3,407,869
INSTRUMENT COOLING SYSTEM

John J. J. Staunton, Oak Park, Ill., assignor to The Perkin-Elmer Corporation, a corporation of New York Filed Jan. 16, 1967, Ser. No. 609,495
10 Claims. (Cl. 165—80)

ABSTRACT OF THE DISCLOSURE

A self-cooling cabinet for a laboratory spectrophotometer, the interior of the cabinet is cooled by placing the instrument's heat dissipiating components on a finned heat sink which is in turn mounted within a vertically extending duct. This duct opens into the cabinet at its bottom and is open to the atmosphere at its top. The upward convection current through the duct draws cool air through inlet openings located on the front and sides of the cabinet. A further vent slot adjacent the partition separating the duct from the interior of the cabinet is employed to prevent recirculaion of heated air within the cabinet.

*Background and summary of the invention*

This invention relates generally to arrangements for cooling electrical apparatus and, more particularly, to a novel, self-cooling enclosure for such apparatus.

Heat is produced whenever an electrical current flows through a resistive circuit path. The amount of heat produced (in watts) is equal to the product of the total path resistance (in ohms) and the square of the current (in amperes). Although this heating effect is essential to the operation of incandescent lamps, electric ovens, and the like, it proves to be quite troublesome in many other applications. In electronic instruments, heat produced in this fashion must be expelled from the instrument enclosure in order to prevent improper operation of the apparatus and possible damage to its component parts. In a laboratory spectrophotometer, for example, large rises in temperature may alter or degrade the sample being tested, and also may adversely affect the photometric and optical system causing photometric and wavelength errors.

Although the substitution of solid-state devices for vacuum tubes greatly reduces the amount of heat produced by electronic deivces, heating continues to present a significant problem to the instrument designer. Power transistors, power transformers, loading resistors, and the like, all produce heat which must be disposed of if undesirable temperature increases are to be avoided.

In the design of spectrophotometers and other heat sensitive instruments, the use of conventional ventilating and forced-air cooling schemes is impractical. A spectrophotometer includes a mechancially positioned optical system and a galvanometer, both of which would be adversely affected by the vibration and air buffering effects created by a cooling fan. In addition, a large flow of blown air would tend to bring harmful dust and lint into the instrument case. Ventilating a spectrophotometer by placing apertures in both the floor and roof of the cabinet is also undesirable. Light passing outwardly through vents near the instrument's exciter lamp may dazzle the operator. Room light must in turn be prevented from reaching the instrument's photocell in order to prevent photometric errors. Even if such problems could be eliminated by appropriately placed light shields, the size and number of the ventilating apertures required for adequate cooling would greatly detract from the appearance of the cabinet and would offer reduced protection against the deposition of dust and lint on the spectrophotometer's optical system.

It is accordingly a general object of the present invention to cool the interior of an electrical instrument enclosure without creating vibration while, at the same time, preserving the exterior appearance of the enclosure and protecting the instrument against the deposition of dust and lint.

It is a further object of the invention to provide such cooling without requiring the use of moving parts or components other than those normally required for the instrument.

In a principal aspect, the present invention takes the form of a novel, self-cooling enclosure for electrical apparatus which includes at least one heat dissipating component and one temperature sensitive component. According to the invention, the enclosure is provided with a vertically extending duct having an inlet port at its bottom and an exhaust port at its top, the inlet port being in communication with the interior of the enclosure and the exhaust port being in communication with its exterior. The heat dissipating component, typically one or more power transistors mounted on a heat sink or radiator, is positioned within the duct to produce an upward convection current of heated air through the duct. The resulting upward air flow through the duct tends to sweep cool air through the enclosure, past the heat sensitive components and outward through the duct. That portion of the vertical duct which partitions the duct from the remaining interior of the enclosure is preferably constructed of a material having low thermal conductivity. A second exhaust vent is preferably positioned at the top of the enclosure adjacent the vertical duct so that air heated by the partition is permitted to freely exhaust. In instruments including a source of radiant heat (such as the exciter lamp in a spectrophotometer) which must necessarily be positioned within the cooled enclosure, the partition may be positioned and adapted to absorb this radiant heat, thereby tending to increase both the convection flow through the duct and the exhaust flow through the second vent.

These and other objects, features and advantages of the present invention will become more apparent through a consideration of the following detailed description and the accompanying drawing.

*Description of the preferred embodiment*

Figures 1, 2:
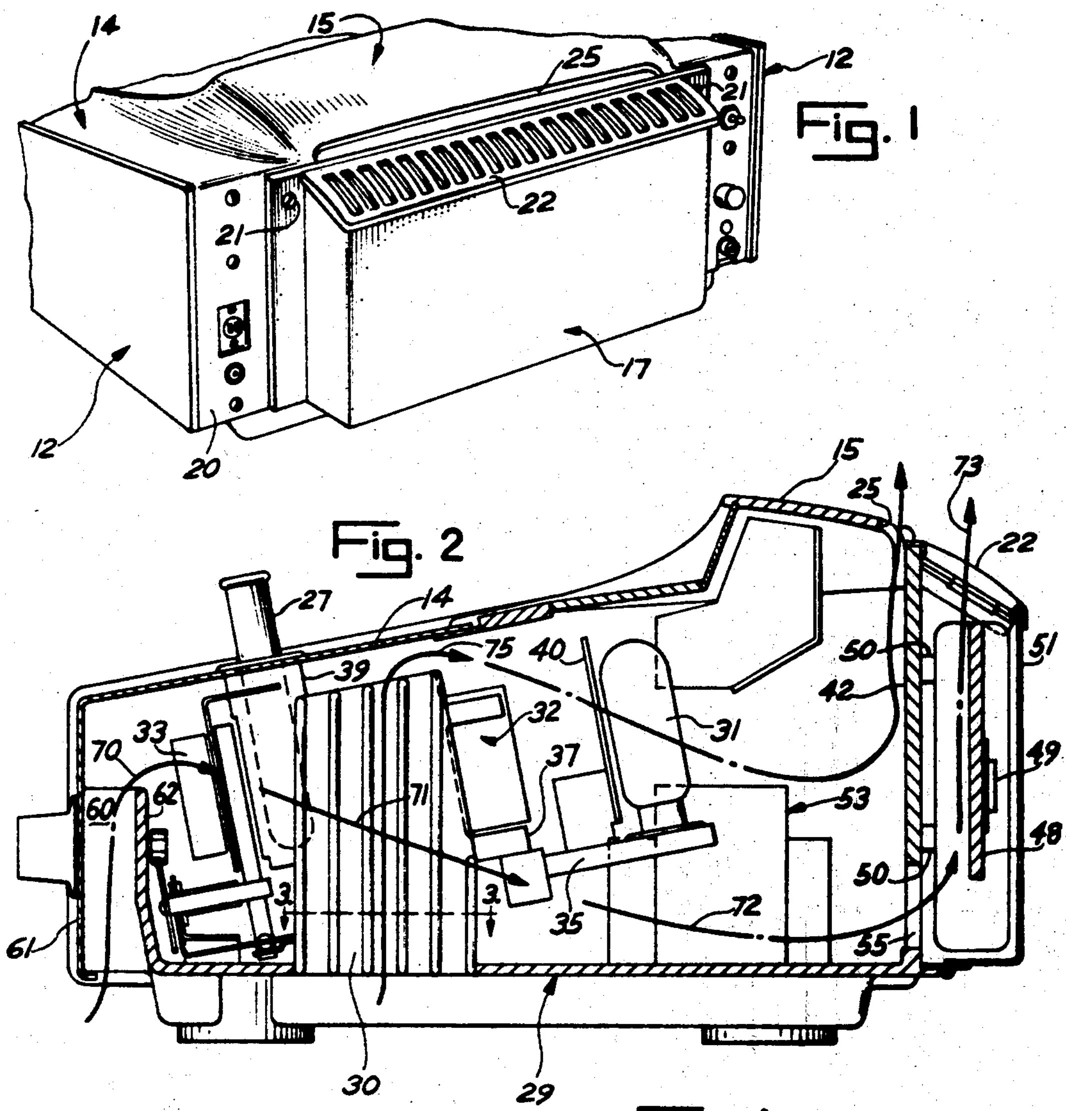
FIGURE 1 is a perspective view of the rear of a laboratory spectrophotometer embodying the principles of the invention.
FIGURE 2 is a side, cross-sectional view of the spectrophotometer shown in FIGURE 1 illustrating the manner in which cool air is routed therethrough in accordance with the invention.
Figure 4:
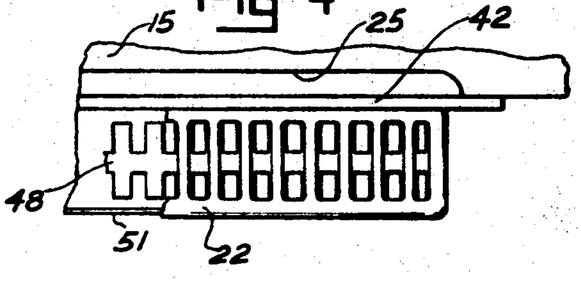
FIGURE 4 is a partial top view of the exhaust duct assembly formed at the rear of the enclosure shown in FIGURE 1.
Figure 3:
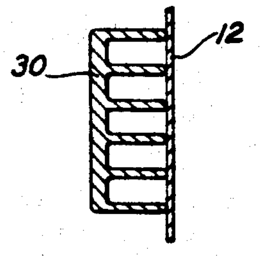
FIGURE 3 is a partial cross-sectional view looking downward upon one cool air inlet port and taken along the line 3—3 of FIGURE 2.

The principles of the present invention may be best illustrated by reference to the attached drawing which shows several views of a compact, laboratory spectrophotometer which is cooled as contemplated by the invention. The operational portions of the instrument are housed within an enclosure, a portion of which is shown in the rear, perspective view of FIGURE 1. The enclosure includes a pair of side walls 12, a sloping top 14 including a cowl portion 15, and a heat pumping duct assembly indicated generally at 17. The duct assembly 17 is hinge mounted on a rear panel 20 and held in place by the fasteners at 21. The interior of duct assembly 17 is open to the atmosphere at its top through a protective grill 22.

A second exhaust vent 25 is provided along the rear edge of the cowl 15.

The spectrophotometer shown by way of illustration in the drawing is adapted to perform photometric chemical analysis upon a sample held in a cuvette 27 shown in FIGURE 2. The optical system which performs this analysis is mounted upon a cast base 29 which underlies the major portion of the instrument enclosure. A finned flange 30, which takes the form of an upward extension of the cast base 29, supports the near side of the optical system which includes an exciter lamp 31, a monochromator assembly indicated generally at 32, and a photocell 33. The exciter lamp 31 is supported on a cast arm 35 which is in turn hinge mounted on a cast optical bench 37. Optical bench 37 also holds a well 39 which receives cuvette 27 and the photocell mount 33.

White light from the exciter lamp 31 is first spread into a color spectrum, a selected monochromatic portion of which is directed through the sample in cuvette 27 by the monochromator 32. That portion of the monochromatic light which is not absorbed by the sample is measured by the photocell in mount 33. The majority of the radiation from exciter lamp 31 is, however, directed rearwardly by a reflective lamp baffle 40 and strikes a partition 42, preferably constructed of black sheet Bakelite or the like, which separates the interior of the instrument enclosure from the interior of duct assembly 17.

The heat dissipating power transistors as well as other heat dissipating components for the instrument are mounted upon a metal casting 48 as illustrated by the transistor 49 shown in FIGURE 2. The heat sink casting 48 is mounted within the interior of the duct assembly 17 by means of the standoff brackets shown at 50 in FIGURE 2. These brackets 50 fasten the casting 48 in spaced relation both from the partition 42 and from the sheet metal shroud 51 which forms the side walls and closed bottom of the duct assembly 17.

Several component parts illustrative of the spectrophotometer shown in the drawings dissipate substantial heat. The exciter lamp 31 gives off approximately 30 watts of heat energy, mostly in the form of radiated heat which is directed against and substantially absorbed by the black Bakelite partition 42. A conventional power transformer 53 is mounted on the cast base 29 adjacent partition 42 and may give off 25 to 30 watts of heat. The power transistors and other components mounted upon the heat sink casting 48, however, constitute the principal source of heat (approximately 60 watts) and raise the heat sink temperature to a level approximately 80° C. above the ambient temperature of the instrument's surroundings. Accordingly, substantial upward flow of air is produced through the duct assembly 17 and out the exhaust port defined by the ventilated grill 22. Duct 17 accordingly acts as a heat pump to pull cool air through that portion of the enclosure which houses transformer 53 and the optical system, this air entering the bottom of duct 17 through a horizontally extending slot 55 defined along the bottom edge of the partition 42. It is important to note that the bottom of duct assembly 17 is otherwise closed to the atmosphere by shroud 51.

Cool air enters the spectrophotometer cabinet at three locations. The first of these is a vertical duct 60 defined by the front panel 61 of the enclosure and an upwardly extending flange 62 which is formed as part of the cast base 29. Cool air is accordingly discharged near the forward upper edge of the interior of the enclosure and flows in a steady stream downward past the optical system and the transformer 53, through the horizontal slot 55, and upwardly through the duct assembly 17, finally being exhausted to the atmosphere through grill 22. This air flow is illustrated by the sequence of arrows 70 through 73. The vertical extending duct 60 insures that cool air will be routed past the temperature sensitive components of the instrument without requiring the use of a normally visible opening along the forward edge of the enclosure.

As illustrated by flow arrow 75, cool air also enters at the sides of the enclosure through a series of vertically disposed, parallel ducts formed by the fins on flange 30, the outer edges of which are mounted flush against the side walls 12. The flange 30 being fastened directly to the optical bench 37, it forms a heat sink for providing still further cooling for the optical system.

The Bakelite partition 42 is heated both by the exciter lamp 31 as explained earlier and by the heat from casting 48 in the duct assembly 17. The air adjacent the interior surface of the Bakelite partition 42 is heated and flows upwardly but is prevented from recirculating within the enclosure by means of the elongated slot 25 through cowling 15. Since slot 25 is located adjacent the interior surface of the partition 42, this upward flow of air serves to carry heat from both heat sink 48 and lamp 31 outward through the vent 25. The exhaust vent 25 and duct assembly 17 thus cooperate to effectively prohibit all recirculation of hot air within the enclosure such that the temperature sensitive components of the optical system are in the path of the cool air flow only.

By applying the principles of the present invention to cool the spectrophotometer shown in the drawings, it has been found possible to limit the rise in temperature at cuvette well 39 (a particularly critical region) to less than 10° C. above the ambient level without the use of cooling fan or a multiplicity of large ventilating apertures. It is to be understood, however, that the specific embodiment of the invention which has been described is merely illustrative of one application of the principles of the invention. Numerous other applications may be devised by those skilled in the art without departing from the true spirit and scope of the invention.

What is claimed is:

1. Self cooling means for electrical apparatus which includes at least one heat dissipating component and one temperature sensitive component, said means comprising, in combination:

an enclosure, at least one temperature sensitive component within said enclosure, a vertically extending duct having an inlet port at its bottom and an exhaust port at its top, said inlet port being in communication with the interior of said enclosure and positioned at the bottom of said enclosure and said exhaust port being in communication with the exterior of said enclosure, at least one heat dissipating component, means for mounting said heat dissipating component within said duct to produce an upward flow of air therethrough, a cool air opening through said enclosure spaced from said duct and having a finned duct means for mounting a heat dissipating component and for pasing cool air toward the enclosure top, and means for mounting said temperature sensitive component within said enclosure in the path of cool air flow from said opening to said inlet port on said duct.

2. An enclosure as set forth in claim 1 including a vent through said enclosure adjacent said duct.

3. Self cooling means for electrical apparatus which includes at least one heat dissipating component and one temperature sensitive component, said means comprising, in combination:

an enclosure, at least one temperature sensitive component within said enclosure, a vertically extending duct having an inlet port at its bottom and an exhaust port at its top, said inlet port being in communication with the interior of said enclosure and said exhaust port being in communication with the exterior of said enclosure, at least one heat dissipating component, means for mounting said heat dissipating component within said duct to produce an upward flow of air therethrough, a cool air opening through said enclosure spaced from said duct, means for mounting said temperature sensitive component within said enclosure in the path of cool air flow from said opening to said inlet port on said duct, and a vent through said enclosure adjacent said duct.

4. An enclosure as set forth in claim 1 wherein said means for mounting said heat dissipating component within said duct includes a finned heat sink.

5. An enclosure as set forth in claim 1 including a vent through said enclosure adjacent said duct.

6. An enclosure as set forth in claim 5, including means for thermally isolating said duct from said enclosure.

7. An enclosure as set forth in claim 5 wherein said means for mounting said heat dissipating component within said duct includes a finned heat sink.

8. An arrangement for cooling the interior of an enclosure comprising, in combination:

an enclosure, a vertically extending duct positioned adjacent said enclosure and separated from said enclosure by a partition having low thermal conductivity, said duct having an exhaust port at its top and having an inlet at its bottom, said inlet being in communication with the interior of said enclosure, a cool air opening through said enclosure at a position spaced from said inlet, and a heat dissipating element mounted within said duct to produce an upward flow of air therethrough whereby cool air flow circulates from said opening through said enclosure to said inlet and is exhausted through said duct.

9. An arrangement as set forth in claim 8 including an elongated slot defined in the top of said enclosure adjacent said partition.

10. An arrangement as set forth in claim 9 wherein a source of radiant heat is mounted within said enclosure and wherein said partition is positioned to absorb said radiant heat.

References Cited

UNITED STATES PATENTS

| | | | |
|---|---|---|---|
| 1,537,228 | 5/1925 | Gargan | 317—100 X |
| 2,463,557 | 3/1949 | Pohm | 317—100 X |
| 2,893,704 | 7/1959 | Passman | 317—100 X |
| 2,947,957 | 8/1960 | Spindler | 317—100 X |
| 2,965,819 | 12/1960 | Rosenbaum | 165—128 X |
| 3,273,021 | 9/1966 | Stark et al. | 174—16 X |

ROBERT A. O'LEARY, *Primary Examiner.*

A. W. DAVIS, *Assistant Examiner.*